United States Patent [19]
Miyahara et al.

[11] Patent Number: 5,482,454
[45] Date of Patent: Jan. 9, 1996

[54] C-TYPE FRAME FOR DIE TIGHTENING UNITS MOUNTED FOR AN INJECTION MOLDING MACHINE

[75] Inventors: Masaaki Miyahara; Nobuyuki Nakamura; Kiyoto Takizawa, all of Nagano, Japan

[73] Assignee: Nissei Plastic Industrial Co., Ltd., Japan

[21] Appl. No.: 309,794

[22] Filed: Sep. 21, 1994

Related U.S. Application Data

[63] Continuation of Ser. No. 11,212, Jan. 29, 1993, abandoned.

[30] Foreign Application Priority Data

Jan. 31, 1992 [JP] Japan .................................. 4-041985
Jan. 31, 1992 [JP] Japan .................................. 4-041986

[51] Int. Cl.$^6$ ............................................. B29C 45/64
[52] U.S. Cl. ........................... 425/547; 100/231; 425/589; 425/450.1; 425/595
[58] Field of Search ........................... 100/231; 425/406, 425/450.1, 451.9, 547, 589, 594, 595

[56] References Cited

U.S. PATENT DOCUMENTS

| | | | |
|---|---|---|---|
| 2,459,845 | 1/1949 | Seely et al. | 100/231 |
| 3,662,640 | 5/1972 | Wrona | 100/231 |
| 4,018,150 | 4/1977 | Shiokawa | 100/231 |
| 4,708,625 | 11/1987 | Arend | 425/450.1 |

FOREIGN PATENT DOCUMENTS

| | | | |
|---|---|---|---|
| 657369 | 3/1938 | Germany | 100/231 |
| 60-213399 | 10/1985 | Japan | 100/231 |
| 264411 | 1/1950 | Switzerland | 100/231 |
| 631361 | 11/1978 | U.S.S.R. | 100/231 |
| 1318183 | 5/1973 | United Kingdom | 100/231 |

*Primary Examiner*—James P. Mackey
*Attorney, Agent, or Firm*—Ostrolenk, Faber, Gerb & Soffen

[57] ABSTRACT

A main frame for a C-type frame for die tightening units mounted for an injection molding machine is prepared by employing a casting process. The main frame includes an opposing pair of side frames, upper frames projecting forward of fore upper surfaces of the side frame and a front frame extending between both the side frames. The side frames, the upper frames and the front frame are cast and integrated with each other to form the main frame having a predetermined width. A base board made by casting or made of a steel plate is bolted to the lower end of the main frame to form a C-type frame, and a pair of support columns each made of a steel material extend through the joint portions where the side frames are integrally joined to the front frame. The tensile strength and the compressive strength of the C-type frame are increased by tightening the support columns via nuts threadably engaged with male threads machined at the opposite ends of each support column. With this construction, the C-type frame can be constructed with lighter weight and smaller dimensions.

11 Claims, 5 Drawing Sheets

3,482,454

C-TYPE FRAME FOR DIE TIGHTENING UNITS MOUNTED FOR AN INJECTION MOLDING MACHINE

This is a Continuation of application Ser. No. 08/011,212 filed on Jan. 29, 1993, now abandoned.

BACKGROUND OF THE INVENTION

1. Field of the Invention

The present invention relates generally to a C-type frame for an injection molding machine. More particularly, the present invention relates to a frame having a substantially C-shaped contour as seen from the side wherein the frame is employable for die tightening units mounted for an injection molding machine for injecting a molten synthetic resin.

2. Background Art

Almost all of the C-type frames have been hitherto produced using steel plates each having a heavy thickness. Specifically, each C-type frame is produced by cutting a steel plate to dimensions of an opposing pair of side frames, upper frames and a front frame extending between both the side frames and then welding them to each other to build an integral structure corresponding to the C-type frame.

Because of the geometrical configuration of the conventional C-type frame as mentioned above, the C-type frame is produced with a large number of manhours consumed therefor. In spite of the fact that it is simple in structure, it is produced at low productivity, resulting in it being unavoidably produced at an expensive cost.

To obviate the foregoing problems, some manufacturers have employed a casting process for producing a C-type frame at improved productivity. However, when the C-type frame is produced by casting, its tensile strength, compressive strength and elastic modules are inferior to those of a C-type frame produced using steel plates having a heavy thickness. Thus, when the manufacturer tries to produce a C-type frame with a reduced quantity of deflection, it is inevitably necessary that each frame member constituting the C-type frame be designed to have a thickness larger than that of a frame member made of a steel plate.

In addition, when the C-type frame is produced with enlarged dimensions, its weight and whole size increase. However, this is contradictory to the latest requirement for designing an injection molding machine with a light weight and small dimensions. For this reason, practical application of a C-type frame produced by employing a casting process is limited only to some of the die tightening units.

In the circumstances as mentioned above, to improve productivity, the manufacturer has tried to design a C-type frame in such a manner that an upper frame is projected forward of the front upper part of a cast main frame, and a base board constituting the bottom of the main frame is integrated with the main frame. In spite of the foregoing designing, however, a tensile strength, a compressive strength and an elastic modules of the cast C-type frame are inferior to those of the C-type frame produced using steel plates having a heavy thickness with the result that the C-type frame is largely deformed when it is loaded with certain exterior force, and especially, the open distance between the main frame and the base board is liable to enlarge.

A quantity of deformation of the C-type frame during the loading has a significant effect on reliable tightening of an injection molding die. If it exceeds a specified allowable quantity, the injection molding die is incompletely opened, resulting in the dimensional accuracy of a molded product being degraded. Although the allowable quality differs depending on a size of each die tightening unit, in case that an injection molding machine is designed with smaller dimensions, it is necessary that a movable board be in parallel with a stationary board within the range of 0.1 mm or less.

It is obvious that the quantity of deformation of the C-type frame can be reduced by designing each frame member constituting the main frame to have a large thickness and an increased weight. However, the designing of the C-type frame in that way is not preferable because an injection molding machine is produced at an expensive cost, and moreover, the weight of the injection molding machine increases.

On the other hand, enlargement of the open distance between the main frame and the base board can be prevented or suppressed by enlarging a diameter of each of bolts extending therebetween or increasing the number of bolts. In spite of the measure taken for the foregoing purpose, however, the present status is such that all the aforementioned problems are left still unsolved.

SUMMARY OF THE INVENTION

The present invention has been made in consideration of the foregoing background.

An object of the present invention is to provide a C-type frame for die tightening units mounted for an injection molding machine wherein the whole C-type frame can be constructed with a lighter weight and smaller dimensions than a conventional C-type frame by employing support columns each made of a steel material so as to allow a cast main frame to be more reliably connected to a base board made by casting or made of a steel plate.

Another object of the present invention is to provide a C-type frame for die tightening units mounted for an injection molding machine wherein the C-type frame can be employed not only for a vertical type injection molding machine but also for a horizontal type injection molding machine.

Further object of the present invention is to provide a C-type frame for die tightening units mounted for an injection molding machine wherein a quantity of displacement of a main frame can be restricted within the specified allowable range without any increase of weight of the C-type frame by applying a preload to the main frame, and moreover, the movable upper part of the main frame is maintained parallel with the base board within the specified allowable range even though the C-type frame is produced by employing a casting process.

According to the present invention, there is provided a C-type frame for die tightening units mounted for an injection molding machine for injecting a molten synthetic resin, wherein the C-type frame comprises a main frame having a predetermined width; the main frame comprising an opposing pair of side frames, upper frames projecting forward of the fore upper surfaces of the side frames, each of the upper frames having a vertically extending die tightening cylinder formed therein, and a front frame extending between both the side frames; the side frames, the upper frames and the front frame being cast and integrated with each other to constitute the main frame; a base board made by casting or made of a steel plate, the base board being bolted to the lower end of the main frame; a pair of support columns each made of a steel material and extending through the joint portion where one of the side frames is integrally connected to the front frame; and tightening means for firmly connecting the main frame to the base board by tightening nuts threadably engaged with male threads machined at the opposite ends of each of the support columns.

With this construction, the tensile force and the compressive force exerted on the main frame are received by a pair of support columns extending through the joint portions where the side frames are integrally connected to the front frame, causing the load on each frame member constituting the main frame to be reduced. Thus, since the C-type frame can be designed with a reduced wall thickness of each frame member, it can satisfactorily stands against a die tightening force or the like even though its weight is largely reduced.

In addition, since a preload is applied to the C-type frame via the support columns and the tightening means with the aid of heaters, deflection of the main frame can be reduced during loading while exhibiting a minimized quantity of deflection thereof. It is recommendable that effective application of the preload to the main frame is achieved by thermally expanding the support columns in the axial direction with the aid of the heaters and then tightening the support columns via tightening male threads machined at the opposite ends of each support columns.

With the C-type frame constructed in the above described manner, since the strength of the main frame is increased by the support columns compared with the conventional cast C-type frame, the C-type frame of the present invention can be mounted on a machine bed for the injection molding machine with a vertical attitude. In addition, it can be mounted on the machine platform with a horizontal attitude with the aid of a plurality of fitting portions formed on the rear side of the main frame.

Other objects, features and advantages of the present invention will become apparent from reading of the following description which has been made in conjunction of the accompanying drawings.

BRIEF DESCRIPTION OF THE DRAWINGS

The present invention is illustrated in the following drawings which show the structure of a C-type frame for die tightening units mounted for an injection molding machine in accordance with an embodiment of the present invention in which.

DETAILED DESCRIPTION OF THE PREFERRED EMBODIMENTS

The present invention will now be described in detail hereinafter with reference to the accompanying drawings which illustrate a preferred embodiment thereof.

Figure 1:
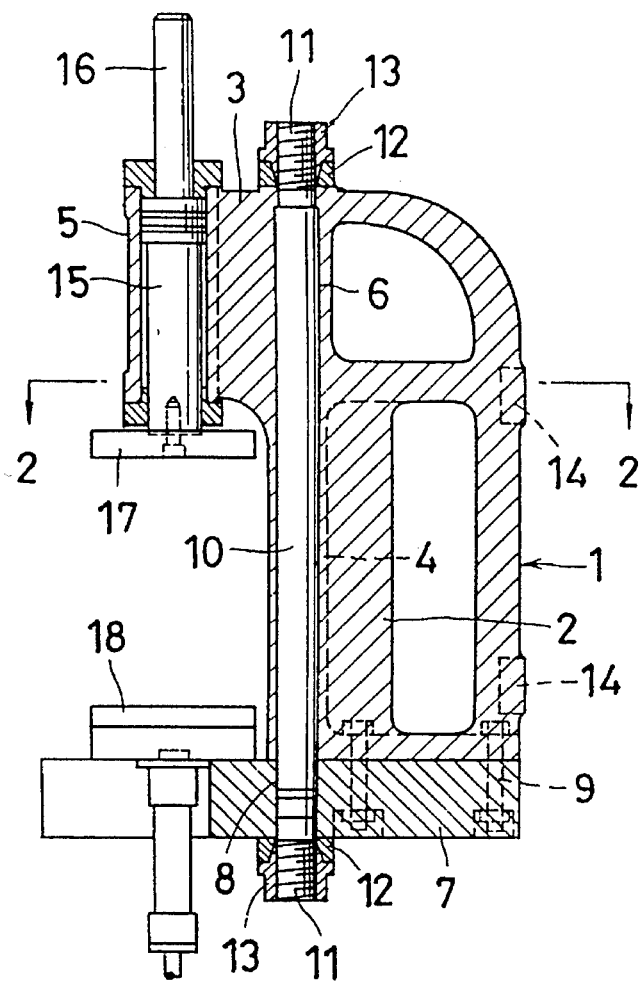
FIG. 1 is a vertical sectional view of the C-type frame taken along B—B in FIG. 2.
Figure 2:
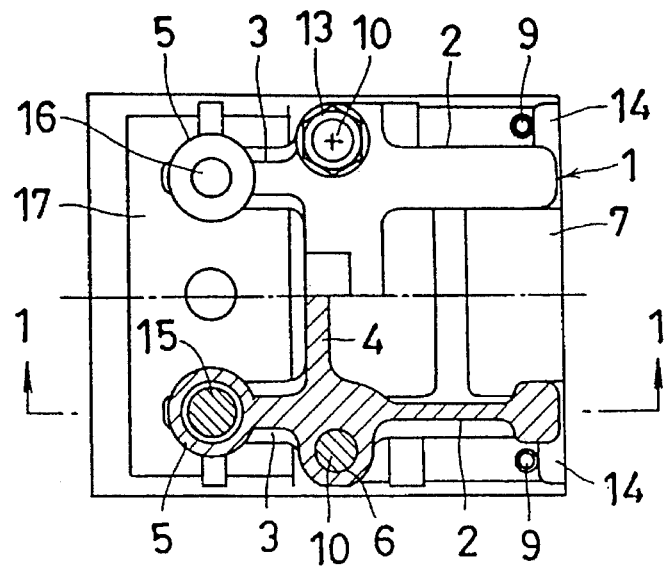
FIG. 2 is a plan view of the C-type frame wherein a lower half of the drawing is a sectional view of the C-type frame taken along A—A line in FIG. 1.
Figure 3:
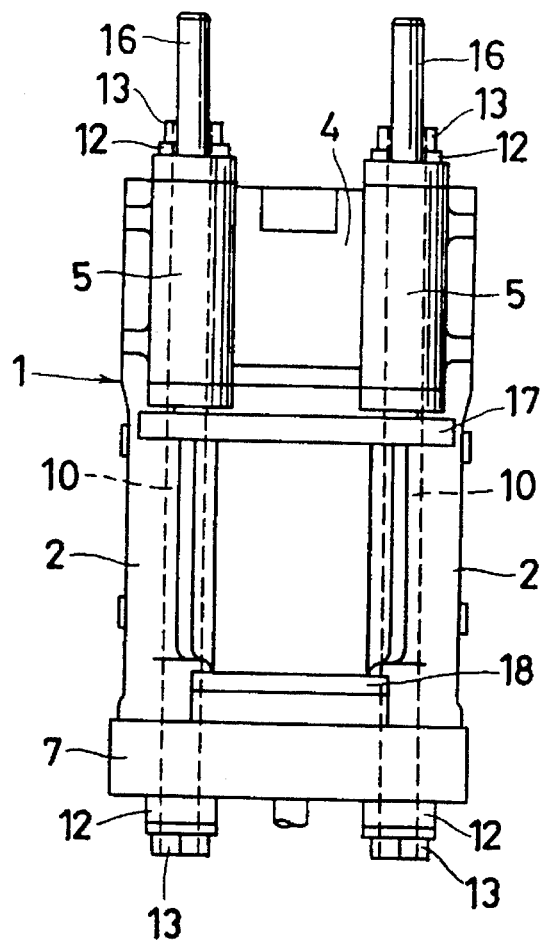
FIG. 3 is a front view of the C-type frame.

In FIG. 1, reference numeral 1 designates a main frame having a predetermined width for mounting an injection molding machine thereon. The main frame 1 is composed of an opposing pair of side frames 2, upper frames 3 projecting forward of the upper surfaces of the side frames 2, and a front frame 4 extending between both the side frames 2, and the foregoing components constituting the main frame 1 are produced in an integral structure by employing a casting process. Vertical type die tightening cylinders 5 are formed at the fore end parts of the upper frames 3, and the joint portions where the side frames 2 are integrally connected to the front frame 4 are designed to have a heavy thickness so as to allow vertically extending through holes 6 to be formed therethrough in the vertical direction.

A base board 7 made by casting a molten steel or made of a steel plate having a heavy thickness is fixedly secured to the lower end of the main frame 1 with a horizontal attitude by tightening a predetermined number of bolts 9, whereby a C-frame having the upper frames 3 and the base board 7 projected forward of the side frames 2 is constructed for an injection molding machine.

Figure 4:
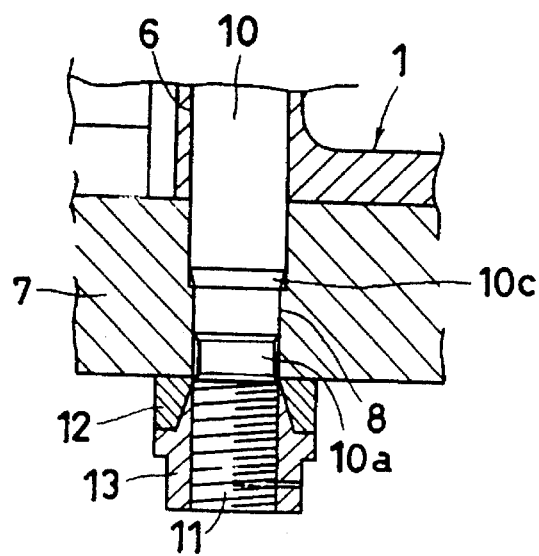
FIG. 4 is an enlarged fragmentary sectional view of the C-frame, particularly showing the tightened state between a base board and the lower end part of a support column.
Figure 5:
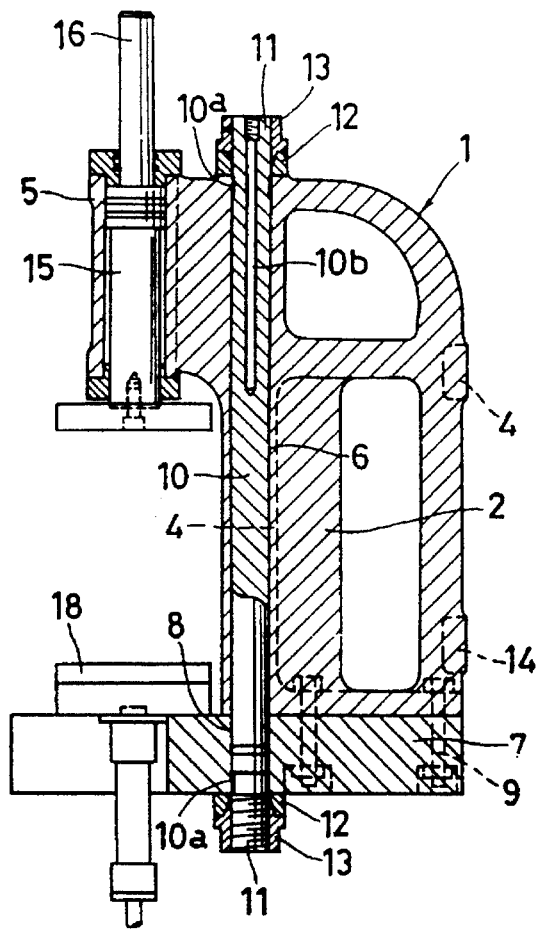
FIG. 5 is a vertical sectional view of the C-type frame shown in FIG. 5 similar to FIG. 1, particularly showing the case that a preload is applied to C-type frame via the support columns.
Figure 6:
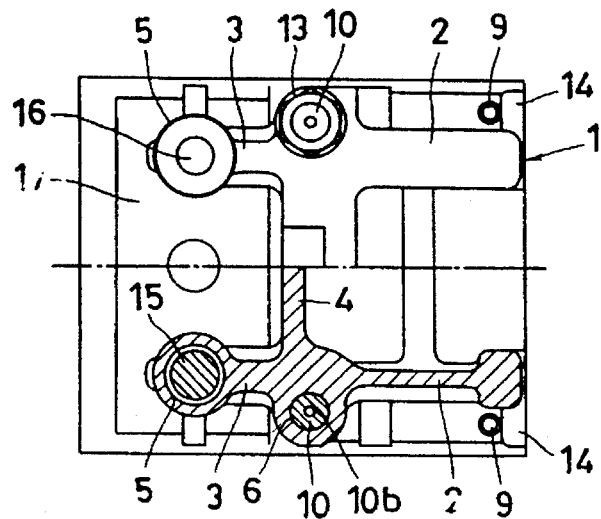
FIG. 6 is a plan view of the C-type frame similar to FIG. 2 wherein a lower half of the drawing is a sectional view of the C-type frame.

Reference numeral 10 designates support columns each of which is made of a round steel rod of which opposite ends are machined to male-threaded shafts 11, and a joint part between the main body of each support shaft 10 and the male-threaded shaft 11 is machined to a neck portion 10a having a diameter slightly smaller than that of the male-threaded shaft 11. As shown in FIG. 4, a part of the lower end of the support column 10 is machined to a tapered part 10c so that the neck portion 10a at the lower end of the support column 10 is dimensioned to have a diameter slightly smaller than that of the neck portion 10a at the upper end of the same.

Each support column 10 designed in the above-described manner is inserted through an insert hole 6 in the side frame 2 and a through hole 8 in the base board 7 from above until the male-threaded shaft 11 at the lower end of the support column 10 projects downward of the bottom surface of the base board 7, whereby the support column 10 extends between the main frame 1 and the base board 7. Subsequently, a washer 12 is fitted onto the male-threaded shaft 11 projecting downward of the base board 7, and thereafter, a nut 13 of which the joint surface is tapered to cooperate with the washer 12 is threadably engaged with the male-threaded shaft 11. Finally, upper and lower nuts 13 are tightened so as to allow the base board 7 to be immovably secured to the main frame 1.

Obviously, the fixing of the main frame 1 to the base board 7 achieved with the tightening force given to the main body 1 by tightening the nuts 13 is strong and reliable compared with the fixing of the main body 1 to the base board 7 achieved merely by tightening the bolts 9. In addition, the arrangement of an opposing pair of support columns 10 makes it possible that the main frame 1 can sufficiently stand not only against the tensile force but also against the compressive force exerted thereon. Since a load to be borne by the respective frame members constituting the main frame 1 can be reduced, the thickness of the main frame 1 can also be reduced even though it is made by employing a casting process. Additionally, the main frame 1 can sufficiently stand against a die tightening force or the like even though its weight is reduced.

In FIG. 1, reference numeral 14 designates fitting portions which are arranged at predetermined positions on the rear side of the side frames 2. A bolt hole (not shown) is formed through each fitting portion 14. In addition, reference numeral 15 designates a piston received in each die tightening cylinder 5. A rod 16 stands upright from the upper end of the piston 15, and a movable plate 17 is fixedly secured to the lower end of the piston 15 with a horizontal attitude.

Reference numeral 18 designates a die mounting board which is placed on the base board 7. An upper die half of an injection molding die (not shown) is fixedly secured to the movable plate 17, while a lower die half of the same is fixedly secured to the die mounting board 18.

With the C type frame for an injection molding machine constructed in the above-described manner, as the tightening force given by tightening the nuts 13 increases, the neck portions 10a of the support columns 10 are forcibly elongated, causing the resultant reactive force to be exerted on the main frame 1 and the base board 7 as a compressive force, whereby a preload is applied to the main frame 1.

To assure that the preload is effectively applied to the main frame 1, heater insert holes 10b each having a predetermined diameter are drilled along center axes of the support columns 10 at the upper parts of the latter to heat the support columns 10 with heaters inserted into the heater insert holes 10b. The heaters cause the support columns 10 to thermally expand in the axial direction, whereby the support columns 10 are additionally tightened in addition to the mechanical tightening achieved by tightening the nuts 13. As the support columns 10 are cooled, they contract to induce a compressive force which in turn is exerted on the main frame 1, causing a preload to be applied to the main frame 1.

Figure 9:
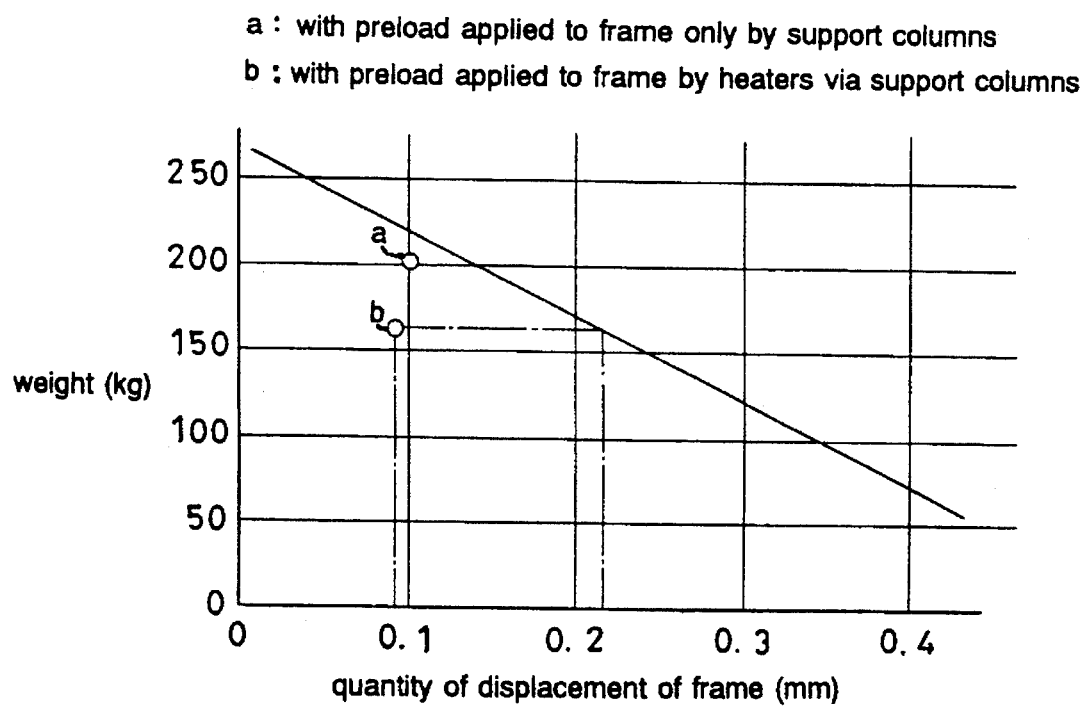
FIG. 9 is a diagram which shows the relationship of weight of the C type frame relative to a quantity of displacement of the same.

FIG. 9 is a diagram which illustrates the relationship of the weight of the C-type frame relative to a quantity of displacement of the same when a die tightening force (10 tons) is applied to the C-type frame. As the weight of the C-type frame is reduced, the quantity of displacement of the same increases as represented by a solid line. In case that the main frame 1 is integrated with the base board 7 via the support columns 10, the quantity of displacement of the C-type frame amounts to about 0.1 mm when the C-type frame has a weight of about 200 kg. When a preload is applied to the C-type frame, the quantity of displacement of the same is reduced to a level of 0.1 mm or less in contrast with the case that the C-type frame is made with the same weight by employing a casting process, resulting in the quantity of displacement of the C-type frame being increased to a level of 0.2 mm or more. This means that the weight of the C-type frame can be reduced by applying a preload to the same.

Figure 7:
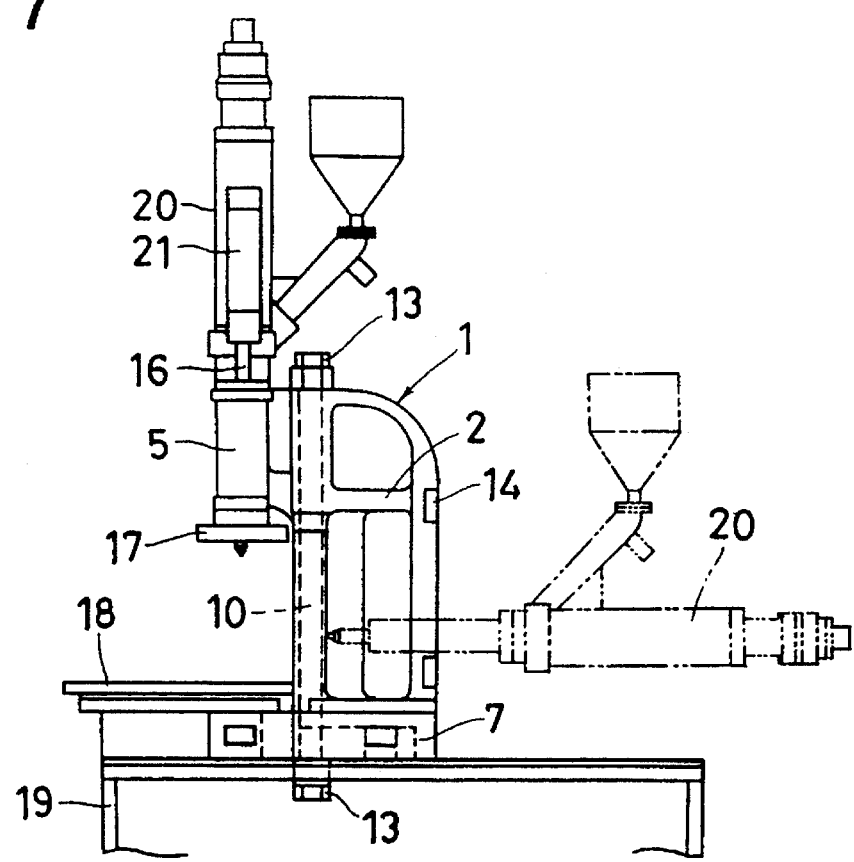
FIG. 7 is a side view of a vertical type injection molding machine for which the C-type frame of the present invention is employed.

As shown in FIG. 7, the C-type frame constructed in the above-described manner is installed on a machine platform 19 while the main frame 1 stands upright on the base board 7. Specifically, the C-type frame is fixedly installed on the machine platform 19 by bolting the base board 7 to the machine platform 19.

According to the general specification for a vertical type injection molding machine, an injecting unit 20 is arranged between both the upper frames 3 with a vertical attitude. The injecting unit 20 is mounted on the C-type frame while the rods 16 of the pistons 15 received in the die tightening cylinders 5 are connected to pistons of nozzle touch cylinders 21 of which detailed description is herein omitted for the purpose of simplification. Incidentally, the nozzle touch cylinders 21 are arranged sideward of the injecting unit 20. With this construction, die closing and die tightening can be achieved by actuating the pistons 15 in the cylinders 5 after the injecting unit 20 is lowered with the aid of the nozzle touch cylinders 21.

In some case, another injecting unit 20 is arranged with a horizontal attitude as illustrated by two-dot chain lines in FIG. 7 so as to perform an injection molding operation using two kinds of synthetic resins each having a different color. In this case, it is recommendable that a nozzle insert hole be previously formed through the front frame 4.

Figure 8:
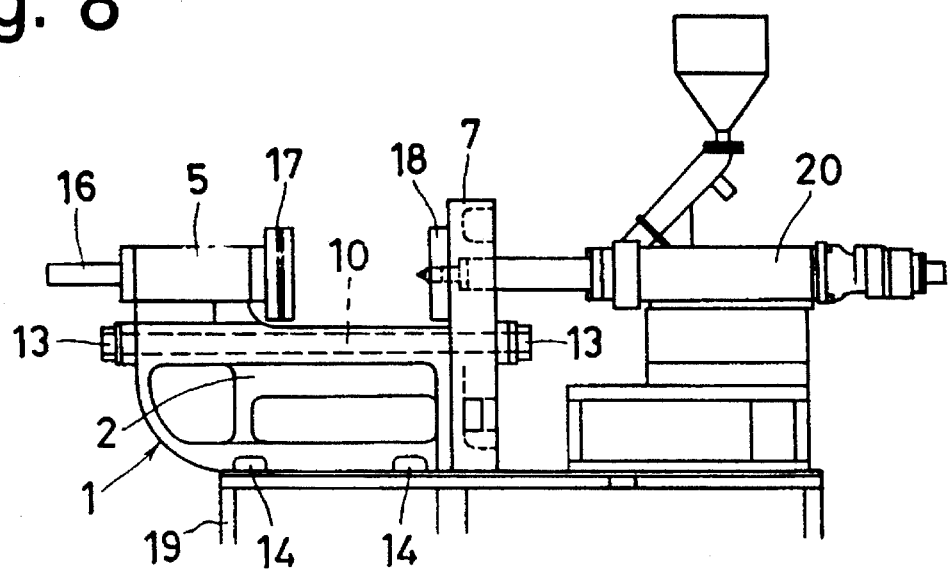
FIG. 8 is a side view of a horizontal type injection molding machine for which the C-type frame of the present invention is likewise employed.

FIG. 8 is a side view of a horizontal type injection molding machine including die tightening units for which a C-type frame constructed according to the present invention is employed. In this case, a main frame 1 is immovably mounted on a machine platform 19 by bolting a plurality of fitting portions 14 on the rear side of the main frame 1 to the machine platform 19 in such a manner that a base board 7 is located inside of the main frame 1 and the main frame 1 is placed on the left-hand side of the machine platform 19.

An injecting unit 20 is mounted on the right-hand side of the machine platform 19 while it is located opposite to the base board 7. In some case, the injecting unit 20 represented by solid lines in FIG. 7 may be mounted on the C-type frame in the same manner as illustrated in the drawing while it is mounted on the machine platform 19 with a horizontal attitude.

As described above, according to the present invention, since the C-type frame for an injection molding machine is constructed such that a pair of support columns are inserted through the main frame from above to reach the bottom surface of the base board, the tensile strength and the compressive strength of the C-type frame can be enlarged, the elastic modules of the same can be increased, and moreover, the strain of the same can be reduced, even though the C-type frame is made by employing a casting process. Consequently, an opposing pair of side frames, upper frames and a front frame extending between the side frames, together constituting a main frame, can have a reduced thickness, respectively, compared with the case that they are made by employing only a casting process, resulting in the weight of the C-type frame being reduced. In addition, the C-type frame can be designed with smaller dimensions.

With the C-type frame constructed in the aforementioned manner, since the cylinders and the fitting portions can be cast and integrated with the main frame, the C-type frame can be made with a small number of manhours compared with the case that it is made of a steel plate each having a heavy thickness by employing a welding process. Moreover, since quality control for the C-type frame can easily be conducted, the C-type frame can be produced at a reduced cost on a mass production line without fluctuation of the strength thereof.

Even though the main frame is made by employing a casting process, since the tensile strength and the compressive strength of the main frame can be increased by arrangement of support columns, and moreover, a quantity of displacement of the main frame can restrictively be reduced by applying a preload to the main frame, the C-type frame can be produced with small dimensions while exhibiting the same strength as the case that the whole C-type frame is constructed using steel plates each having a heavy thickness.

Since the open distance between the upper part of the main frame and the base board does hardly vary irrespective of a quantity of deflection of the main frame, the C-type frame can be used as a frame for a horizontal type die tightening unit as it is. Consequently the C-type frame of the present invention can practically be used in many application fields compared with the conventional C-type frame.

While the present invention has been described above merely with respect to a single preferred embodiment, it should of course be understood that the present invention should not be limited only to this embodiment but various change or modification may be made without departure from the scope of the present invention as defined by the appended claims.

What is claimed is:

1. A C-type frame for die tightening units mounted for an injection molding machine for injecting a molten synthetic resin, the C-type frame comprising:

a one-piece cast main frame; said main frame comprising:
a top end, an opposite bottom end, and a pair of holes extending through the main frame from the top end to the bottom end through substantially the entire height of the main frame;
an opposing pair of side frame portions, each side frame portion having a corresponding fore upper portion, respective upper frame portions projecting forward of the fore upper portions of said side frame portions, each upper frame portion having a corresponding die tightening cylinder, and a front frame portion extending between the side frame portions, a base board attached to said bottom end of said main frame, a pair of support columns, each support column extending through a respective hole of said main frame so that opposite ends of said each support column extend outwardly from said top end of the main frame and a surface of the base board, respectively, and tightening means for rigidly securing said main frame to said base board by respective tightening nuts threadably engaged with male threads machined at the opposite ends of each of said support columns, said support columns extending through said respective holes of said main frame and said base board such that when said nuts are tightened a compressive force extends between the opposite ends of each support column to thereby urge the main frame and base board toward one another.

2. The C-type frame according to claim 1, further comprising means for applying a preload to said main frame to thereby exert a tightening force by said pair of support columns via said nuts threadably engaged with said male threads to rigidly secure said main frame to said base board.

3. The C-type frame according to claim 2, wherein said means for applying a preload comprises heaters inserted into said support columns to axially expand said support columns.

4. The C-type frame according to claim 1, wherein the C-type frame having said base board fixedly secured thereto is mounted on a machine platform for said injection molding machine such that said die tightening cylinders are generally vertical with respect to the machine platform.

5. The C-type frame according to claim 1, wherein the C-type frame having said base board fixedly secured thereto is mounted on a machine platform for said injection molding machine such that said die tightening cylinders are generally horizontal with respect to the machine platform, the C-type frame being mounted on the machine platform by bolting a plurality of fitting portions formed on a rear side of said main frame to said machine platform at predetermined locations.

6. The C-type frame according to claim 1, wherein the main frame has a width that is sufficient for mounting an injection molding machine thereon.

7. The C-type frame according to claim 1, wherein the base board is made by casting.

8. The C-type frame according to claim 1, wherein the base board is made of a steel plate.

9. The C-type frame according to claim 1, wherein the pair of support columns are made of steel.

10. The C-type frame according to claim 1, wherein each support column includes, at each opposite end thereof, a narrowed portion located between the corresponding male threads and a broader main body of each support column.

11. The C-type frame according to claim 10, wherein the narrowed portion at one end of each support column has a diameter smaller than the narrowed portion at the other end of each support column.

* * * * *